UNITED STATES PATENT OFFICE.

FRIEDRICH MAX WINTER, OF FÄHRBRÜCKE, GERMANY.

PROCESS OF MAKING LAKE COLORS.

No. 905,264.  Specification of Letters Patent.  Patented Dec. 1, 1908.

Application filed January 17, 1908. Serial No. 411,321.

*To all whom it may concern:*

Be it known that I, FRIEDRICH MAX WINTER, a subject of the German Emperor, residing at Fährbrücke, in Saxony, in Germany, have invented certain new and useful Methods of Manufacturing Lake Colors, of which the following is a specification.

This invention relates to a new or improved method of manufacturing pigmental lakes.

The invention consists in substituting artificially produced aluminum silicate for the hydrate of alumina commonly used in the manufacture of lake colors. The aluminum silicate referred to is produced by precipitating aluminum sulfate by means of alkaline sodium silicate, the quantities of sodium and silica present during the reaction being so proportioned relatively to the quantity of alumina in each particular case, that the aluminum silicate formed has a molecular constitution suitable for the particular coloring matter to be used. For use with the azo dyes, for example the neutral silicate $Al_2O_3.3SiO_2$ is particularly suitable. For use with basic coloring matter an acid silicate having, approximately, the composition represented by the formula $2Al_2O_3.7SiO_2$ is to be preferred, since most basic dyes can be very easily fixed on this silicate, without difficult or expensive treatment involving the use of stannic acid, tannic acid, or orthophosphoric acid. Lakes having great covering power, though the percentage of coloring matter therein is small, can be produced with this aluminum silicate, and have great coloring power and brilliance.

An example of the manner in which the process can be carried out is as follows. 60 kilograms of crystallized aluminum sulfate dissolved in 1000 kilograms of water are mixed with a 10 per cent. solution of 20 kilograms of calcined soda and 75 kilograms of water-glass (40 degrees Baumé). A 10 per cent. solution of 75 kilograms of Glauber salt is added to this mixture, and then a two per cent. (or weaker) solution of the coloring matter, for example 60 kilograms of orange II dissolved in 3000 liters of water. Finally a 10 per cent. solution of approximately 220 kilograms of crystallized barium chlorid is added. The amount of soda required depends, of course, on the slightly varying alkalinity of the water-glass; the total alkalinity must be sufficient to precipitate the alumina.

The process here set forth is by no means identical with the well-known process in which natural aluminum silicate in the form of kaolin or china clay is used. The methods of using the natural and the artificial silicates are totally different, by reason of the different physical properties of the compounds. The natural white silicate, which deteriorates the brilliance and purity of the color, is only used to a very limited extent for imparting the requisite covering power to lakes, and is in this respect practically equivalent to barium sulfate. Artificially precipitated aluminum silicate does not by any means fulfil the same purpose. It is a transparent, gelatinous substance, resembling more closely the ordinary hydrate of alumina, and must be used in conjunction with a white substratum adapted to impart covering power.

It has been proposed to use, in the manufacture of lakes, basic coloring matter and sodium silicate in the form of water-glass, but the water-glass is in that case to be added at the end of the operation, and only in small quantities, for the purpose of precipitating the coloring matter from the solution on to the aluminum hydrate previously produced in the usual manner.

What I claim as my invention and desire to secure by Letters Patent of the United States is:—

The method of manufacturing lake colors by precipitating aluminum silicate in the presence of the coloring matter.

In witness whereof I have signed this specification in the presence of two witnesses.

FRIEDRICH MAX WINTER.

Witnesses:
 EMIL SCHMIDT,
 PAUL WEINERT.